United States Patent Office 2,809,023
Patented Oct. 8, 1957

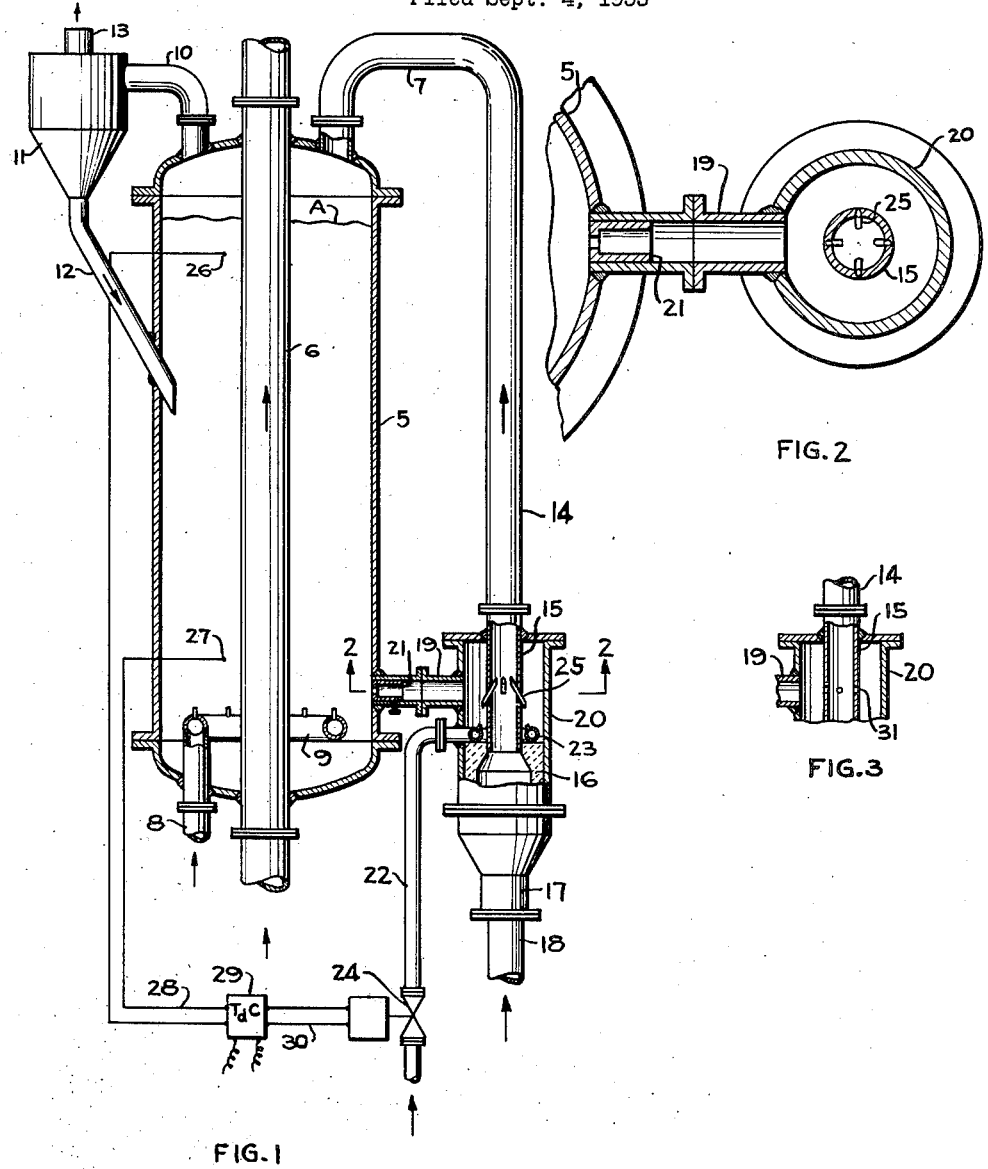

2,809,023
CONTROL OF CIRCULATION OF FINELY DIVIDED SOLIDS

Pieter Jan Schoenmakers and Willem L. van de Putte, Delft, Netherlands, assignors to Shell Development Company, Emeryville, Calif., a corporation of Delaware Application September 4, 1953, Serial No. 378,504

Claims priority, application Netherlands September 8, 1952

11 Claims. (Cl. 263—21)

This invention relates to an improved method and device for controlling the flow of finely divided solids. It is particularly applicable for controlling the circulation of such solids in a system including a riser to the bottom of which is supplied a gas for entraining the solids upwards and a downcomer which receives the solids from the riser at the top and discharges them into a lower part of the riser, the material in the downcomer being kept in a fluidized state.

Such a system is, for example, useful for heating or cooling a process stream that flows in a flow channel such as a tube that is exposed to the solids in the downcomer, e. g., situated within the downcomer. Such heat transfer apparatus and method are disclosed and claimed in our copending application Serial No. 301,634, filed July 30, 1952, now Patent No. 2,698,171, of which this application is a continuation-in-part. In such apparatus the heat is transmitted by the solids, which are in direct heat exchange with the entraining gas in the riser and also in direct contact with the tube in the downcomer; depending upon the temperature relations, the solids may impart heat to the tube or abstract heat therefrom.

As is explained in the said copending application, the temperature and temperature gradient established in the downcomer in such apparatus is controlled, apart from the temperature of the entraining gas, by the rate at which the solids are circulated through the riser and downcomer. The instant invention is concerned particularly with the control of the circulation rate.

The patent to Huff, No. 2,412,152, describes a device by which the circulation of finely divided material in a catalytic cracking plant provided with a riser and a downcomer can be controlled. This device is located at the bottom of the riser and consists of a sliding cylindrical gate surrounding this riser and controlling the size of the passage from the downcomer to the riser, by which the rate of flow of catalyst from the downcomer into the riser can be adjusted.

This sliding cylindrical gate, which is almost entirely surrounded by fluidized, finely divided material, can be operated by means of a number of piston-cylinder assemblies, the pistons being mechanically coupled to the cylindrical gate. The position of the pistons can be adjusted by feeding a medium under pressure to the upper or lower side of the pistons. This method of controlling the passage has the disadvantage, however, that when the cylindrical gate is moved the friction arising between the moving parts can become very great, as the gate has to work under very unfavorable conditions, namely, in surroundings where high temperatures prevail and much dust occurs.

The object of the invention is to provide a method and device for controlling the circulation of finely divided material in a system of the type described, this device having no moving parts, and in which, therefore, mechanical breakdowns as a result of unfavorable working conditions are obviated.

In summary, according to the invention the control apparatus includes a fluidization chamber or lift pot having an inlet for the admission of finely divided solids and means for maintaining said solids in a fluidized state, said chamber communicating with the said riser through narrow passageways through which the solids enter the riser, in which they are entrained by entraining gas. The said fluidizing means includes means for admitting fluidizing gas into the chamber at a controlled rate, whereby the degree of fluidization can be controlled. The rate of flow of solids from the said chamber into the riser can then be controlled by varying the degree of fluidization.

By this arrangement the lift pot operates as a kind of pneumatic valve for regulating the transit of finely divided material, which permits the degree of closure of the valve to be adjusted by controlling the rate at which fluidizing gas is admitted to the chamber.

If the finely divided solids are used as a heat-transmitting medium in a heat exchanger, e. g., of the type described in the said copending patent application, the fluidization chamber, herein also referred to as the auxiliary chamber, may surround the lower part of the riser and be annular in shape; the inner wall of the chamber may in this case be made of metal and constitute the outside wall of the riser at this point. The lower part of the riser may then form a continuation of a combustion chamber when the exchanger is used for heating.

Further, in accordance with a further feature of the invention, the quantity of fluidization gas admitted to the auxiliary chamber may be controlled manually or automatically in accordance with the difference in temperature of the fluidized, finely divided solids between two vertically displaced points in the downcomer.

The term "fluidized bed" as used herein refers to a mass of solids in a state of hindered settling in a gas, the mass exhibiting a liquid-like mobility.

The invention will be further described with reference to the accompanying drawing forming a part of this specification and illustrating by way of example two embodiments of the invention, both applied to a plant wherein heat generated by a burner is transmitted, via a circulating fluidized bed of solids, to the wall of a tube through which flows the medium or process stream to be heated. In the drawing:

Figure 1 is a vertical sectional view of a heater employing the controller according to the invention;

Figure 2 is a horizontal sectional view, taken on the line 2—2 of Figure 1, on an enlarged scale; and Figure 3 is a fragmentary vertical sectional view of a portion of the heater according to Figure 1, showing a modified construction of the controller.

Referring to Figures 1 and 2, 5 is a vertically elongated column forming a downcomer. It contains one or more tubes 6 for the passage of a process stream in either vertical direction. Finely divided solids, such as sand, are admitted to the top via inlet conduit 7 and are maintained in a fluidized state by admitting fluidizing gas at the bottom through a fluidization conduit 8 and a distributor 9. Fluidizing gas and combustion gas entering through the conduit 7 are discharged at the top through a flue duct 10, preferably provided with suitable means such as a cyclone 11 for separating entrained solids. Solids thus recovered are returned through a return conduit 12 which enters the downcomer beneath the level A of the fluidized bed and gases freed from solids are discharged at 13.

The riser comprises a vertical pipe 14 communicating at the top with the conduit 7 and having a part 15 thereof at the bottom that communicates with the top of a combustion chamber 16 in which fuel is burned in a burner 17, e. g., by admitting gaseous fuel and air through a pipe 18. The burner is lined with refractory material, such as firebrick. The cross-sectional area of the riser is selected in relation to the rate at which combustion gases from the combustion chamber ascend to insure entrainment of solids admitted to the bottom of the riser, e. g., from 16 to 100 feet per second. These solids are admitted from the bottom of the downcomer through a return conduit 19 and the auxiliary fluidization chamber 20, which are the subject of this invention.

The parts described above may be thermally insulated and subject to various modification, as suggested in the aforesaid copending patent application. For example, the riser and downcomer may be arranged concentrically, e. g., with the riser inside an annular downcomer; insulation of the riser 14 is then unnecessary and the return conduit 19 can be omitted, the solids in this case being admitted to the chamber 20 directly through constricted holes in the outer wall thereof and said outer wall being situated within the downcomer.

The return conduit 19 preferably is constricted, e. g., by a replaceable insert 21, to provide a limited passageway of the desired size for controlling the rate of flow of fluidized solids from the downcomer into the auxiliary fluidization chamber 20. This chamber has a fluidization conduit 22 communicating with a distributor 23 for admitting fluidizing gas into the lower part of the chamber at a controlled rate determined by a flow control valve 24 which is advantageously controllable remotely, e. g., by a solenoid, although a manually operated valve may be used. The part 15 of the riser tube has a plurality of inclined jet tubes 25 extending into the riser and open at both ends to receive solids from the auxiliary chamber at a level above the distributor 23.

For automatic control of the valve 24, temperature sensing elements or thermostats, such as thermocouples 26 and 27, are mounted at vertically spaced points within the downcomer and connected by suitable control circuits, diagrammatically indicated at 28, to a differential temperature controller 29 which is, in turn, connected by a circuit 30 to the valve.

Referring to Figure 3, the construction differs from that previously described only in the omission of the jet tubes 25; in this case the solids enter the riser through a plurality of small holes 31.

In operation, the unit is first charged with a suitable quantity of solids. A wide variety of solid materials may be used; it is desirable to grade the particles to exclude particles differing widely from the mean particle diameter. Sand is preferred although other solids, such as metal oxides of the type used as catalysts may be used. By avoiding the use of extremely fine particles the recovery of the solid from the gas in the cyclone 11 is facilitated, and by avoiding excessively large particles the use of correspondingly high upward gas velocities in the riser is obviated. Without limiting the invention thereto, it may be stated that graded sand having diameters from about 0.005 to 0.10 inch is preferred. Thus, a typical sand may consist of particles 95% of which have diameters about 0.007 inch and below 0.010 inch. The burner is placed in operation and the hot combustion gases emerging from the top of the combustion chamber 16 ascend through the riser tube 15, 14, at a velocity sufficient to entrain solids admitted through the jet tubes 25 or holes 31. This results in a dispersed suspension and commingling and direct heat exchange between the gas and the solids, and brings about a practically homogeneous temperature of the suspension admitted to the top of the downcomer through the pipe 7. The enlarged cross-sectional area of the downcomer causes a reduced velocity and consequent disengagement of most of the solids, which descend and enter the fluidized bed beneath the level A. Fluidizing gas admitted through the conduit 8 and distributor 9 maintains solids as a fluidized bed in intimate contact with the tube 6, whereby heat is transferred to the said tube. The return conduit 19 being above the distributor 9, the solids form a bed that exerts hydrostatic pressure, whereby some of the solids pass through the constriction in the insert 21 and enter the auxiliary fluidization chamber 20. The distributor 23 in the latter is situated at a level beneath the conduit 19, whereby the admitted solids are maintained in a fluidized bed that exerts a hydrostatic pressure causing the solids to enter the jet tubes 25 or the holes 31. The chamber 20 and parts associated therewith thus form a lift pot. The circuit for the passage of solids is thus closed and the solids are again entrained and heated in the riser.

After circulation has been established through the riser and downcomer the rate of admission of auxiliary fluidizing gas through the conduit 8 can usually be reduced, to maintain in the downcomer a dense or a turbulent fluidized bed, as desired, it being only necessary that sufficient fluidization occur to insure flow through the return conduit 19.

The heat transfer from the combustion gases generated in the combustion chamber to the tube 6 depends to a great extent upon the circulation rate of the finely divided solids and it is, therefore, desirable to be able to control the rate of circulation. This can be done in a simple manner by controlling the degree of fluidization in the auxiliary chamber 20; the size of the constriction in the insert 21 also influenced the rate of circulation but cannot be varied during operation. If, for instance, the rate at which auxiliary fluidizing gas is admitted through the conduit 22 is increased, the density of the fluidized bed in the chamber 20 will decrease. The viscosity of the bed is thereby reduced, as a result of which the flow resistance exercised by the chamber 20 on the passage of the fluidized solids from the return conduit 19 to the riser is reduced and the flow rate of the solids is increased. The circulation rate of the solids in the riser 14 and in the downcomer 5 therefore increases, making greater heat transmission possible. By decreasing the quantity of auxiliary fluidizing gas the opposite effect is achieved.

An advantage of the construction shown, wherein the lower part 15 of the riser 14 is surrounded by the auxiliary chamber 20 and the latter is annular, is that the part of the riser forming a continuation of the firebrick-lined combustion chamber 16 is well cooled, so that the lower part of the riser can be constructed entirely of metal. It is further advantageous to direct the openings in the distributor inwardly towards the wall 15, as shown, to obtain additional cooling of this wall.

Back mixing of particles in the downcomer, that is, mixing between particles at different levels, takes place only to a limited extent, and an appreciable temperature gradient can be realized in this chamber. Thus, when the heat transfer wall of the tube 6 is being heated, the particles in contact with the lower part thereof are cooler than those at the top.

When the circulation rate of solids decreases, there will be a more rapid cooling thereof in the downcomer, assuming a constant rate of heat absorption by the tube 6. This will result in an increase in the temperature difference between the temperature sensing elements 26 and 27. The differential temperature controller 29 is adjusted to open the valve 24 upon such an increase in the temperature difference, thereby admitting auxiliary fluidizing gas to the chamber 20 at an increased rate and increasing the solids circulation rate. This, in turn, reduces the temperature limits between which the circulating solids move. Conversely, the controller 29 moves the valve 24 toward closed position to decrease the solids circulation rate when the temperature difference between the elements 26 and 27 is too small. Additional adjustment of the heat transfer can be obtained by controlling the quantity of fuel fed to the burner according to the initial temperature and/or the flow rate of the process stream to be heated in the tube 6.

The controller or lift pot according to the invention can, of course, also be applied when the system is used to cool a process stream, cool air instead of combustion gases being then supplied to the riser. Moreover, the invention can be applied for controlling the circulation of finely divided catalyst mass in a catalytic cracking plant, for example, in a plant such as that described in the patent to Voorhees et al, No. 2,378,342.

We claim as our invention:

1. Apparatus for controlling the flow of finely divided solids comprising, in combination: a riser duct; means for supplying a gas into a lower part of the riser duct for up flow therein; a first chamber adapted to contain finely divided solid material having means for maintaining said solids in a fluidized state; an auxiliary fluidization chamber adjacent the lower part of said riser duct and communicating with said first chamber for receiving said solids therefrom, said riser duct being in communication with said auxiliary chamber through one or more constricted passageways; means for admitting auxiliary fluidizing gas into said auxiliary chamber at a level beneath the said constricted passageway; and flow control means for varying the rate of admission of said auxiliary fluidizing gas into said auxiliary chamber for varying the degree of fluidization of solids therein, thereby to control the rate of flow of said solids from the auxiliary chamber into the riser duct.

2. Apparatus according to claim 1 wherein the said auxiliary fluidization chamber is annular and surrounds the lower part of said riser duct and said constricted passageways are distributed circumferentially about the riser duct.

3. Apparatus according to claim 2 wherein said lower portion of the riser duct is tubular and has holes therethrough constituting the said constricted passageways.

4. Apparatus according to claim 2 wherein the said lower portion of the riser duct is tubular and has a plurality of jet tubes extending therethrough, inclined upwardly toward the inside of the riser duct, said jet tubes constituting the said passageways.

5. Apparatus according to claim 1 wherein said means for supplying gas to the lower part of the riser duct include a combustion chamber having refractory walls and provided with a burner, said lower part of the riser duct forming an upward extension of the combustion chamber and being of all-metal construction.

6. Apparatus according to claim 5 wherein said means for admitting auxiliary fluidizing gas into the auxiliary chamber includes a distributor having discharge openings directed toward the said lower part of the riser duct for cooling the latter.

7. A temperature conditioner comprising, in combination: a riser duct for the upward flow of gas and finely divided solids; means for supplying a gas into a lower part of the riser duct for upflow therein and for direct heat exchange with said solids; a downcomer adapted to contain said solids in a fluidized state and communicating at the top with said riser for receiving said solids therefrom; a heat transfer wall within said downcomer situated to be contacted by said solids in the downcomer for direct heat exchange therewith; an inlet for admitting fluidizing gas into the downcomer; an auxiliary fluidization chamber adjacent a lower part of said riser duct communicating with said downcomer through a return passageway at a lower part thereof above the said inlet therein; an inlet in the auxiliary chamber for admitting auxiliary fluidizing gas into said auxiliary chamber at a level beneath said return passageway, said lower part of the riser duct being in communication with the auxiliary chamber through one or more constricted passageways situated above the said inlet for auxiliary fluidizing gas; means including a flow controller for supply auxiliary fluidizing gas to the said inlet in the auxiliary chamber; temperature sensing elements situated within said downcomer at vertically spaced points; and actuating means interconnected between said temperature sensing elements and said flow controller for operating the latter in accordance with the temperature difference between said elements.

8. Apparatus for the controlled elevation of finely divided solids comprising, in combination: a riser duct having a gas inlet at a lower part thereof; means for supplying a gas into said gas inlet of the riser duct for upflow therein; a fluidization chamber horizontally adjacent a part of said riser duct above said gas inlet having an inlet for receiving said solids, said riser duct being in communication with said fluidization chamber through one or more constricted passageways situated above the bottom of the fluidization chamber and above said gas inlet; means for admitting fluidizing gas into said fluidization chamber at a level beneath the said constricted passageway; and flow control means for varying the rate of admission of said fluidizing gas into said fluidizing chamber for varying the degree of fluidization of solids therein, thereby to control the rate of flow of said solids from the fluidizing chamber into the riser duct.

9. A method of feeding finely divided solids into a confined ascending gas stream for transport thereby, comprising the steps of flowing said solids in a fluidized state into an enlarged fluidized bed region, maintaining said solids in a state of fluidization in said enlarged region by admitting into said enlarged region a fluidizing gas at a controlled rate, flowing said solids from said enlarged region through restricted passageways having a fixed flow area into said confined ascending gas stream, and controlling the rate of flow of said solids into said confined ascending gas stream by varying the rate of admission of said fluidizing gas into said enlarged region, thereby varying the degree of fluidization therein.

10. In a method of circulating finely divided solids, the steps of flowing said solids from a first enlarged fluidized bed region through a restricted communication zone into a second and auxiliary enlarged fluidized bed region, maintaining said solids in a state of fluidization in said second enlarged region by admittng into said second enlarged region a fluidizing gas at a controlled rate, flowing said solids from said second enlarged region through restricted passageways having a fixed flow area into a confined ascending gas stream and controlling the rate of flow of said solids into said confined ascending gas stream by varying the rate of admission of said fluidizing gas into said second enlarged region, thereby varying the degree of fluidization therein.

11. A method of circulating finely divided solids in a closed circulating system comprising the steps of flowing said solids in a dispersed state upwardly in a confined ascending gas stream, thence downwardly through a disengaging zone into a first enlarged fluidized bed region, then through a restricted communication zone into a second and auxiliary enlarged fluidized bed region, maintaining said solids in a state of fluidization in said second enlarged region by admitting into said second enlarged region a fluidizing gas at a controlled rate, flowing said solids from said second enlarged region through restricted passageways having a fixed flow area into said confined ascending gas stream, and controlling the rate of flow of said solids into said confined ascending gas stream by varying the rate of admission of said fluidizing gas into said second enlarged region, thereby varying the degree of fluidization therein.

References Cited in the file of this patent

UNITED STATES PATENTS

| Number | Name | Date |
|---|---|---|
| 2,405,395 | Bahlke et al. | Aug. 6, 1946 |
| 2,432,872 | Ferro | Dec. 16, 1947 |
| 2,447,306 | Bailey et al. | Aug. 17, 1948 |
| 2,493,498 | Peery | Jan. 3, 1950 |
| 2,493,911 | Brandt | Jan. 10, 1950 |
| 2,525,925 | Marshall | Oct. 17, 1950 |
| 2,609,249 | Winter | Sept. 2, 1952 |
| 2,614,028 | Schaumann | Oct. 14, 1952 |
| 2,621,113 | Alther | Dec. 9, 1952 |
| 2,625,442 | Kollgaard | Jan. 13, 1953 |
| 2,676,852 | Kirkbride | Apr. 27, 1954 |